June 11, 1968  R. WEINSTEIN  3,387,622
VALVE
Filed Sept. 22, 1965  2 Sheets-Sheet 1
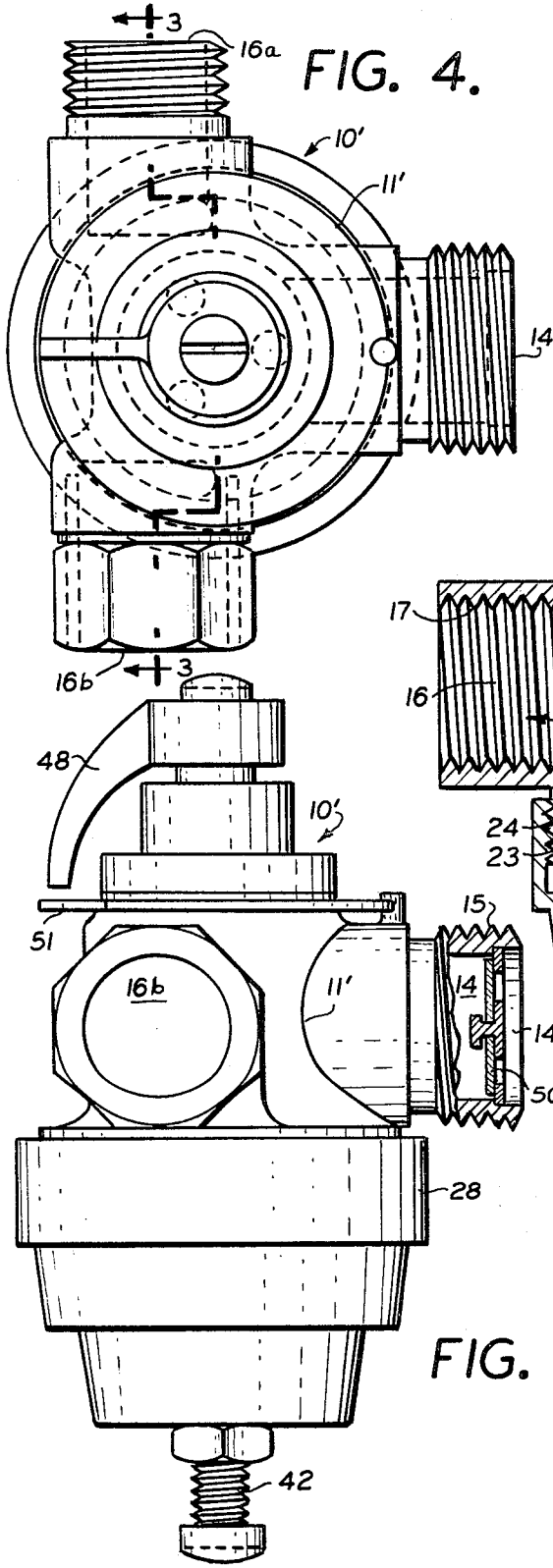
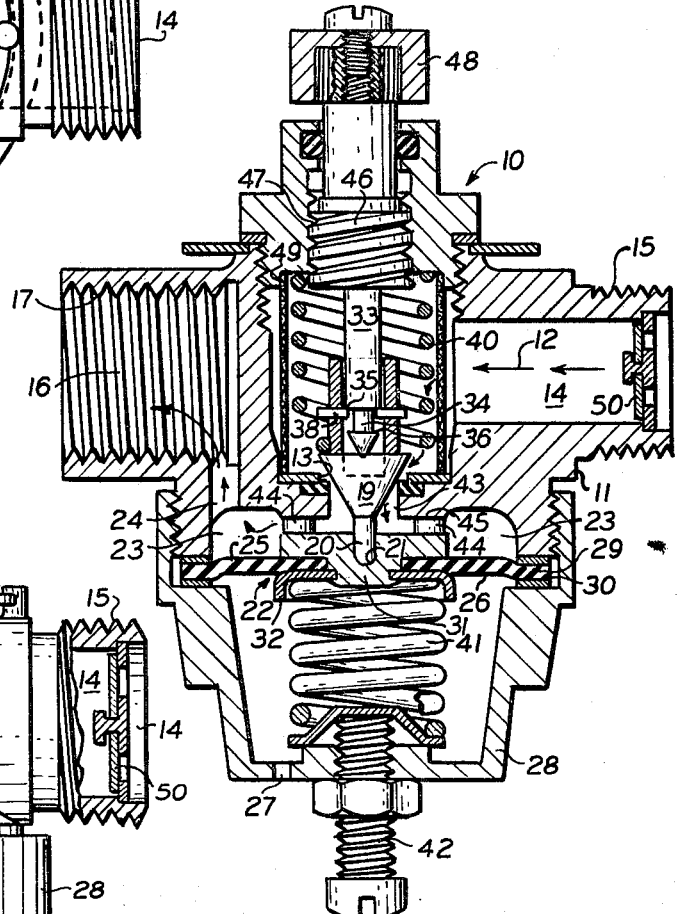
INVENTOR
RICHARD WEINSTEIN
BY
Burgess, Dinklage + Sprung
ATTORNEYS.

June 11, 1968 R. WEINSTEIN 3,387,622
VALVE
Filed Sept. 22, 1965 2 Sheets-Sheet 2

INVENTOR
RICHARD WEINSTEIN
BY
Burgess, Dinklage & Sprung
ATTORNEYS.

United States Patent Office 3,387,622
Patented June 11, 1968

3,387,622
VALVE
Richard Weinstein, Huntington, N.Y., assignor to Flair Manufacturing Corp., Hauppauge, N.Y., a corporation of New York
Filed Sept. 22, 1965, Ser. No. 489,124
8 Claims. (Cl. 137—495)

This invention relates in general to valves, and more particularly to a gate valve incorporating automatic means for controlling the flow of fluid therethrough in response to the fluid pressure existing at its outlet.

In addition, the gate valve of the instant invention provides auxiliary or override means for selectively permitting or cutting off the flow of fluid from its inlet portion to its outlet portion independently of the automatic flow control means.

The gate valve according to the invention includes certain basic elements which are common to valves in general. For example, the gate valve of the invention has a body including a fluid passage therethrough, a valve seat disposed in said body to divide said fluid passage into an inlet and an outlet portion, and a valve gate member disposed within said body for movement relative to the valve seat and for operative engagement therewith to cut off fluid flow from the inlet to the outlet, with such fluid flow being permitted when the gate member is disposed out of engagement with the valve seat.

However, the valve of the invention offers numerous advantages over prior art valves in that it provides gate positioning means responsive to the fluid pressure at the outlet for positioning the gate into and out of operative engagement with the valve seat. By such means, whenever the fluid pressure at the outlet exceeds a predetermined value, the gate is positioned to cut off fluid flow. This function is performed automatically, and whenever the outlet fluid pressure falls below this predetermined value, the gate is positioned out of engagement with the seat thereby permitting fluid flow.

If desired, the valve of the invention can be modified in a manner which will become obvious hereinafter so as to effect closure of the valve at and below a predetermined outlet pressure, or to effect either closure or opening of the valve in response to a predetermined inlet pressure.

In combination with the aforesaid automatic gate positioning means, the valve of the invention includes an additional positioning means operatively connected to the gate so as to permit same to be positioned manually to cut off or to permit fluid flow independently of the operation of the automatic gate positioning means and regardless of pressure conditions at the outlet.

This additional gate positioning means includes a spindle disposed in operative engagement with the valve body for movement relative to the valve seat. The spindle is operatively connected to the valve gate with a limited free play movement being provided therebetween for selectively positioning the gate either in a flow cut off condition, a flow through condition, or in a free play position which permits automatic gate control by the other positioning means responsive to outlet pressure.

Thus, the valve of the invention is capable of three basic modes of operation, i.e., automatic gate control, manual gate closure, and manual gate opening.

The automatic positioning means for the valve gate includes a first spring disposed in operative engagement with the gate to urge same toward a position of engagement with the valve seat whereby fluid flow is cut off. The effect of the first spring is resisted by a second spring which acts against a diaphragm disposed in operative engagement with the gate, said diaphragm being movable relative to the valve seat. The diaphragm is exposed on one side to the fluid pressure at the outlet, and on the other side is vented to the atmosphere. As the outlet pressure increases, the diaphragm is urged against the influence of the second spring so as to permit the first spring to move the gate in a direction for engagement with the seat to cut off fluid flow. The first and second springs have force-deflection characteristics which are selected in relation to each other to effect gate closure at and above a predetermined outlet pressure level. Below such level, the gate is maintained in an open position by the combined opposing forces exerted upon the gate by the first and second springs.

Adjustable means can be provided in accordance with the invention for preloading the second spring so as to permit selective variation of the outlet pressure at which gate closure is effected.

In its preferred embodiment, the valve of the invention is designed as a dual outlet liquid fill valve which can be connected to a source of pressurized liquid such as a city water supply main for supplying liquid to a closed system, such as for example, a hot water heating system. Both valve outlets are flow connected in parallel so as to be at a common fluid pressure at all times, one of such outlets being provided for direct connection to the main portion of such heating system, and the other being provided to accommodate the flow connection of an expansion tank to the system. In such applications, the valve of the invention is ideal because it permits water to pass from the supply main into the closed system until a predetermined pressure level is reached in the closed system, as determined at the valve outlet which is flow connected to such system. When the predetermined system pressure level is reached, further flow of water to the closed system is cut off by the valve, thus sealing the system off from the supply main. If, at any time the pressure within the closed system drops the preset level, the valve will open automatically thereby allowing recharging of the system from the supply main.

The provision of additional independent means for opening and closing the gate in the valve of the invention is particularly advantageous in cases where such valve is used as a heating system water fill valve. For example, with the valve of the invention, it is possible to manually cut off the water supply to the closed heating system whenever necessary, as in the case of boiler repairs. By providing such independent shut-off capability, water flow to the boiler can be blocked off while permitting normal operation of domestic water services. Without such capability, in most home heating installations, it would be necessary to shut off the entire water supply at the service entrance main valve.

Likewise, with the provision of a manually operable means which opens the valve independently of the outlet pressure control means, it becomes possible to bypass, or override the operation of the automatic controlled gate positioning means so as to permit substantially unrestricted flow of water from the supply main into the closed system. Such capability is desirable in that it permits a faster filling of the system and also permits utilizing the high pressure of the supply main during filling for efficient purging of air from the system.

It is therefore, an object of the invention to provide a valve for controlling the flow of fluid which will automatically effect flow shut-off at a predetermined outlet pressure.

Another object of the invention is to provide a valve as aforesaid wherein additional independent means are provided for selectively effecting fluid flow therethrough and for cutting off such fluid flow.

A further object of the invention is to provide a valve as aforesaid wherein the outlet pressure required to effect fluid flow shut-off can be adjustably varied.

A further object of the invention is to provide a valve as aforesaid wherein a single, manually operable means is provided for selectively effecting fluid flow and for cutting off such flow independently of the automatic means provided therefor, and in which such manual and automatic means are mutually compatible in normal operation.

Other and further objects and advantages of the invention will become apparent from the following detailed description and accompanying drawings in which:

FIG. 1 is a front elevation view, partly in section, of a valve constructed in accordance with a simplified embodiment of the invention.

FIG. 4 is a top view of the valve shown in FIG. 2.

FIG. 5 is a side elevation view of the valve shown in FIG. 2.

Figure 2:
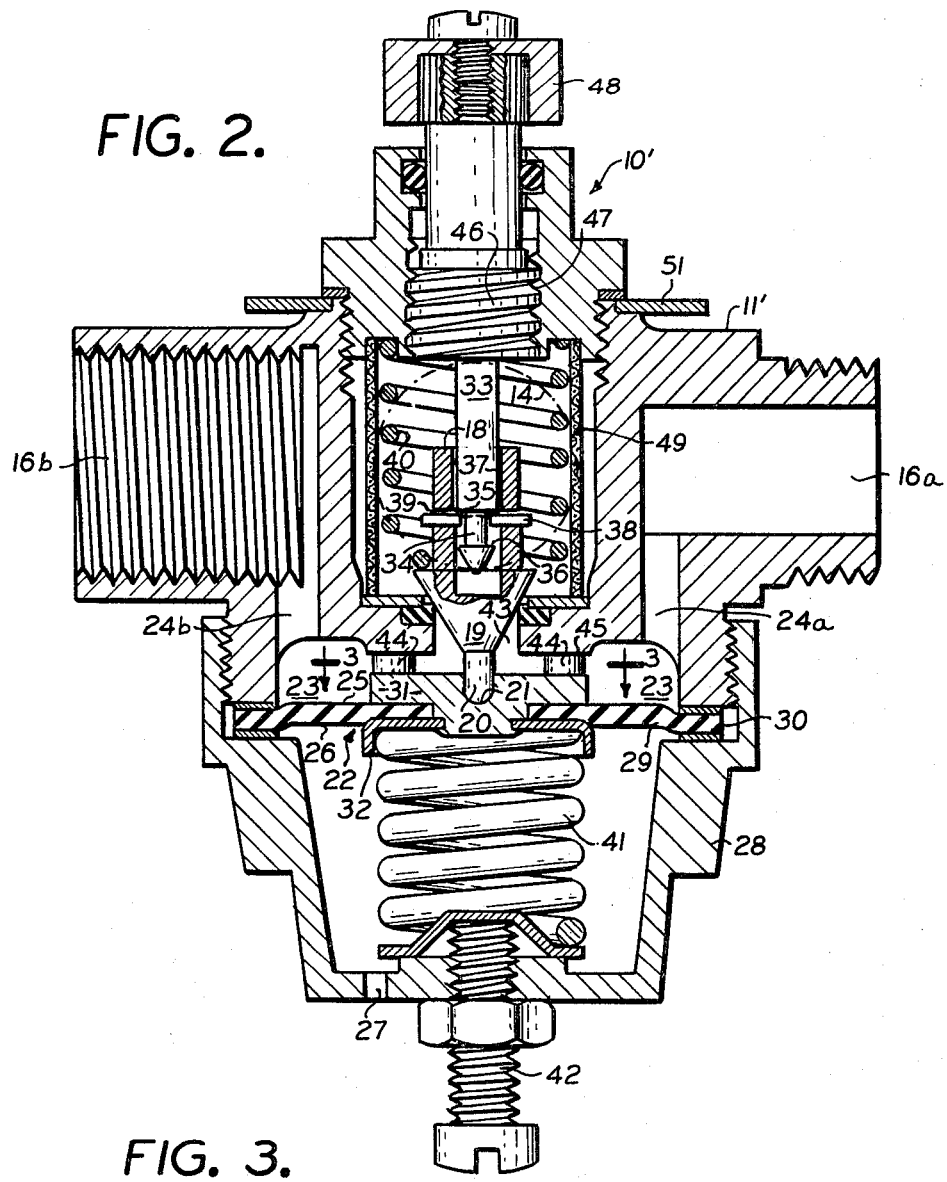
FIG. 2 is a front elevation view, partly in section, of a valve constructed in accordance with a preferred embodiment of the invention.

Referring now to FIG. 1, the valve 10 is provided with a body 11 including a fluid passage 12 therethrough, and a valve seat 13 which in effect divides the fluid passage 12 into an inlet portion 14 adapted to be flow connected to a source of pressurized fluid (not shown), i.e., a liquid or a gas supply main, as for example, by means of a male threaded fitting 15 and an outlet portion 16 which is similarly adapted for flow connection to fluid receiving system (not shown) such as a water heating system (not shown), by means of a female threaded fitting 17.

A valve gate member 18 is disposed within a central portion of the body 11 for movement along a path approximately coaxial with the valve seat 13 and for operative engagement therewith to cut off fluid flow from the inlet 14 to the outlet 16.

While a variety of gate 18 configurations can be used in the valve 10 of the invention, the gate 18 is provided with a frusto-conical portion 19 which when pressed into and against the rim of the seat 13, effects a cut-off of fluid flow through the valve 10 and seals off the inlet 14 and outlet 16 portions from one another. The gate 18 is also provided with a downwardly projecting post portion 20 extending from the lower end of the frusto-conical portion 19 and adapted for engagement into a recess 21 provided in a diaphragm member 22.

The valve body 11 is constructed with an annular cavity 23 flow connected by a passage 24 to the portion of the outlet 16 defined by the interior of the fitting 17 so as to be at the same fluid pressure therewith, thus making said cavity 23 in effect an extension of the outlet 16.

One side 25 of the diaphragm member 22 is arranged so as to be exposed to the fluid present within the cavity 23, and thus is acted upon by the outlet 16 fluid pressure. The opposite 26 of the diaphragm member 22 is vented to the atmosphere by means of a passage 27 extending through the bell portion 28 of the body 11.

The diaphragm member 22 includes a flexible membrane 29, such as can be made from rubber, plastic, sheet metal, etc., which is clamped around its outer peripheral edge 30 against the body 11 by the bell portion 28, and which is also clamped around its central portion to a button member 31 which contains the recess 21 for the post 20, by means of a spring seat member 32.

The gate 18 is connected to a spindle 33 for movement thereby into and out of engagement with the valve seat 13. A limited amount of free play is provided in the gate 18 to spindle 33 connection so as to permit the gate 18 a limited amount of axial movement independent of the spindle 33. This is accomplished by constructing the spindle 33 with an axial section 34 of reduced diameter and bounded at its extremities by the shoulders 35 and 36 of spindle 33 sections of greater diameter. The gate 18 is provided with an axially disposed bore 37 for receiving the end portion of the spindle 33 with the reduced diameter section 34. A snap ring 38 is mounted to the gate 18 for partial extension into the bore 37 thereof through slots 39. The bore 37 is the gate 18, the spindle 33 and its reduced diameter portion 34, and the snap ring 38 are so constructed and arranged in relation to each other that the gate 18 is capable of limited sliding movement relative to the spindle 33 over a distance corresponding to that over which the gate 18 must move in going from a position of sealing engagement with the valve seat 13 to a position whereat substantially full fluid flow occurs through said seat 13.

The gate 18 is positioned to and out of engagement with the valve seat 13 in response to the fluid pressure existing at the outlet 16 by means of a mechanism which comprises a first spring 40 disposed in operative engagement with the gate 18 to urge same toward a position of operative engagement with the seat 13 for cutting off fluid flow through the valve 10, the diaphragm member 22 which is disposed in operative engagement with the post 20 of the gate 18 to position the frusto-conical portion 19 thereof relative to the seat 13, and a second spring 41 disposed in operative engagement with the diaphragm member 22, which is movable relative to the seat 13 in response to the outlet 16 fluid pressure. The second spring 41 which opposes the force exerted by the first spring 40 which is in turn transmitted to the diaphragm member 22 via the post 20, and also the outlet 16 fluid pressure force exerted on said diaphragm member 22, has a deflection-force characteristic selected in relation to that of the first spring 40 such that when the outlet 16 fluid pressure exceeds a predetermined value, the diaphragm member 22 is moved away from the seat 13 against the influence of the second spring 41 by a distance sufficient to permit the gate 18 with the aid of the first spring 40 to operatively engage the seat 13 and thereby cut off fluid flow through the valve 10.

The configuration shown in FIG. 1 represents a condition wherein the outlet 16 fluid aided by force of the spring 40 is insufficient to overcome the opposing force exerted on the diaphragm member 22 by the spring 41, which is preloaded by means of an adjustment screw 42. Under such conditions, the diaphragm member 22 is at its closest position relative to the seat 13, but is held at a predetermined spaced-apart distance away from the outlet side 43 of the seat 13 by means of upwardly projecting lugs 44 which are laterally spaced apart from one another and are held in abutting contact against a shoulder surface 45 by the force of the spring 41. The post 20 and frusto-conical portion 19 of the gate 18 are so dimensioned in relation to the diameter of the seat 13, the length of the lugs 44 and the depth of the recess 21 that said gate 18 is positioned out of operative engagement with the seat 13 thereby permitting the flow of fluid therethrough under such conditions.

The provision of the lugs 44 assures the free passage of fluid through the valve 10 when the gate 18 is in the open condition. However, with a suitable choice of springs 40 and 41, the button 31 of the diaphragm member 22 can be maintained without the aid of such lugs 44 in a spaced-apart position relative to the outlet side 43 of the seat 13 so as not to cut off flow at fluid pressures below the intended level.

As the outlet 16 pressure increases, the diaphragm member 22 is moved away valve seat 13 thereby permitting the spring 41 to position the gate 18 in closer to the seat 13 to gradually restrict and eventually cut off fluid flow therethrough. When the outlet 16 pressure has increased to a predetermined level established by the forces of the springs 40 and 41 and the geometry of the gate 18, post 20, recess 21 and seat 13, the diaphragm member 22 will assume a position sufficiently distant from the seat 13 such that the frusto-conical portion 19 of the gate 18 will seal off seat 13 opening thereby terminating fluid flow therethrough.

In the event that the outlet 16 pressure decreases, the force exerted on the diaphragm member 22 will correspondingly decrease thereby resulting in said diaphragm member 22 being pushed upward toward the seat 13 by the spring 41. Since the post engages into the blind recess 21, the entire gate 18 will be pushed upward out of sealing engagement with the seat 13 thereby effecting the opening of the valve 10.

The foregoing description of the automatic operation provided by the valve 10 presupposes that the gate 18 is free to slide upon the spindle 33 to the extent necessary to accomplish such opening and closure of said valve 10. For this purpose the length of the reduced diameter portion 34 of the spindle 33 as measured between its shoulders 35 and 36 is such that when the diaphragm member 22 is at the position shown in FIG. 1, there is sufficient freedom of axial movement for the gate 18 to follow the downward movement of the diaphragm member 22 for effecting flow cut off when said diaphragm member 22 assumes the position corresponding to the outlet 16 pressure selected for flow cut off.

In the event it is desired to shut off the flow of fluid through the valve 10 at any time regardless of the outlet 16 pressure, this can be done simply by moving the spindle 33 inward toward valve seat 13 until the gate 18 is pressed into sealing engagement with said seat 13. For this purpose, the spindle 33 is constructed with a threaded portion 46 disposed in operative engagement with a similarly threaded portion 47 in the valve body 11. A handle 48 is provided for rotating the spindle 33 to move the gate 18 inward to close the valve 10 or outward to open said valve 10 against the effect of either spring 40 or 41. To close the valve 10, it is only necessary to turn the handle 48 so as to move the upper shoulder 35 against the snap ring 38 to push the gate 18 downward against the effect of the spring 41 and into sealing engagement with the seat 13 thereby the valve 10. To open the valve 10, the handle 48 is turned so as to bring the lower shoulder 36 on the spindle 33 against the snap ring 38 and pull the gate 18 upward away from the seat 13 against the force of the spring 40. Of course, it is to be understood that in moving the gate 18 either upward or downward by means of the spindle 33 it will be necessary to traverse such axial free play zone between said gate 18 and spindle 33 as exists due to the outlet 16 pressure acting upon the diaphragm member 22.

As can be appreciated by the artisan, other equivalent means (not shown) for moving the gate 18 to effect either fluid flow or cut off of such flow through the valve 10 independently of the outlet 16 pressure controlled automatic means can be provided, since the specific means shown in FIG. 1 for purposes of example does not represent the only means possible for performing such function.

Also, the inlet 15 and outlet 17 connections to the valve 10 can be reversed so that the gate 18 is controlled in response to the inlet 14 pressure rather than in response to the outlet 16 pressure such that whenever the inlet 14 pressure exceeds a predetermined value, fluid flow through the valve 10 is cut off.

For practical applications, the valve 10 is preferably provided with fluid filtering means, such as for example, a screen 49 disposed between the inlet 14 and the valve seat 13 so as to prevent particles of foreign matter jamming between the gate 18 and seat 13.

Also, a flow check means, such as a check valve 50, is disposed across the inlet portion 14 of the valve body 11 to prevent reverse fluid flow from the outlet portion 16 through the inlet portion 14 as might occur if the outlet 16 pressure were low enough to prevent gate 18 closure but higher than the inlet 14 pressure.

For practical applications in heating systems (not shown) the valve of the invention is preferably constructed in the form of the valve 10' exemplified by FIGS. 2–5. The valve 10' is provided with substantially the same means for opening and closing its gate 18 in response to the fluid pressure at its outlet, and the same independent gate 18 control means as is the simplified valve 10.

However, the valve 10' differs from the valve 10 in that its body 11' is provided with a pair of outlet connections 16a and 16b, which are flow connected in parallel by means of passages 24a and 24b respectively to the annular cavity 23, and hence will be at a common fluid pressure. This particular dual outlet 16a, 16b feature either outlet 16a or 16b to be flow connected to an expansion tank (not shown) commonly used in heating systems, and the other to the inlet side of the boiler (not shown) thereby eliminating the need for an extra fitting (not shown) for connecting such an expansion tank into the heating system.

For this purpose, the outlets 16a and 16b are expediently positioned 180° apart with respect to each other, and 90° apart with respect to the inlet 14.

In the event it is not desired to utilize the extra outlet 16a or 16b provided in the valve 10', such outlet 16a or 16b can be either capped or plugged by means of conventional pipe caps or plugs as required, and the valve 10' will be operable in substantially the same manner as the valve 10.

On the exterior portion of the valve 10' as well as on the valve 10, a calibrated dial plate 51 can be provided and the handle 48 can be shaped so as to function as a pointer in relation to the dial plate 51 to permit a visual indication of the spindle 33 position relative to the valve seat 13, so as to enable one to determine by inspection whether said spindle 33 is positioned to place the valve 10' in its automatic gate 18 control mode of operation wherein the opening and closing of the gate 18 is effected solely by the outlet pressure, or whether the gate 18 has been opened or closed independently of its associated automatic positioning mechanism.

For this purpose, the pitch of the threaded portions 46 and 47 are preferably made such that a handle 48 rotation of less than 360° will move the spindle from an upper position wherein the gate 18 is fully opened and unaffected by the outlet pressure acting on the diaphragm member 22, i.e. wherein the lower shoulder 36 is pulled against the snap ring 38, to a lower position wherein the gate 18 is fully closed and likewise unaffected by the diaphragm member 22, i.e. wherein the upper shoulder 35 is pushed against the snap ring 38. With such an arrangement, the automatic gate 18 control mode would correspond to a portion on the dial 51 intermediate between the manually opened and manually closed extreme positions thereon.

What is claimed is:

1. A gate valve comprising a body including a fluid passage therethrough, a valve seat disposed in said body to divide said fluid passage into an inlet portion and an outlet portion, a valve gate member disposed within said body for movement relative to the valve seat and for operative engagement therewith to cut off fluid flow from said inlet to said outlet portion, and positioning means responsive to fluid pressure at said outlet portion and disposed in operative engagement with said valve gate member for positioning same into and out of operative engagement with the valve seat in response to the fluid pressure at said outlet portion whereby whenever the fluid pressure at said outlet portion excess a predetermined value, the valve gate member is positioned to cut off fluid flow from the inlet portion to the outlet portion, said positioning means includes a first spring member disposed in operative engagement with said valve gate member to urge same toward a position of operative engagement with the valve seat for cutting off fluid flow between said inlet and outlet portions, a diaphragm means disposed in operative engagement with said valve gate member to position same relative to the valve seat, and a second spring member disposed in operative engagement with said diaphragm means, said diaphragm means being movable relative to said valve seat in response to fluid pressure at said outlet portion, said second spring member having a deflection-force characteristic selected in relation to that of the first spring member whereby when the fluid pressure at the outlet portion exceeds a predetermined value, said diaphragm is moved away from said valve seat and against the influence of said second spring member by a distance sufficient to permit the valve gate member with the aid of said first spring member to operatively engage said valve seat and thereby cut off fluid flow, and including a spindle disposed in operative engagement with said valve body for movement relative to the valve seat, said spindle being operatively connected to said valve gate member with limited free movement therebetween for selectively positioning said valve gate member to cut off and to permit fluid flow independently of said diaphragm means and said first and second spring members.

2. The gate valve according to claim 1 including an additional positioning means operatively connected to said valve gate member for selectively positioning same to cut off and permit fluid flow from said inlet to said outlet portion independently of the positioning means responsive to fluid pressure at the outlet portion.

3. The gate valve according to claim 1 including adjustment means operatively connected to said positioning means for selectively varying the predetermined value of outlet pressure to which said positioning means responds to position said valve gate member for cutting off fluid flow.

4. The gate valve according to claim 1 wherein one side of said diaphragm means is disposed for communication with fluid in the outlet portion, and the opposite side of said diaphragm means is disposed for communication with the ambient atmosphere.

5. The gate valve according to claim 1 including adjustable preloading means operatively connected to said second spring member for selectively varying the fluid pressure force required to move said diaphragm means against said second spring member to effect fluid flow cut off by said valve gate member.

6. The gate valve according to claim 1 including fluid flow check means disposed in the inlet portion of said valve body to prevent reverse fluid flow from the outlet portion through said inlet portion.

7. The gate valve according to claim 1 including fluid filtering means disposed between said inlet portion and the valve seat.

8. The gate valve according to claim 1 including indicator means operatively connected to said spindle to indicate the position thereof relative to said valve seat and hence to signify the valve gate positions corresponding to the opening and closing of the valve independently of the diaphragm means and first and second spring members.

References Cited

UNITED STATES PATENTS

| | | | |
|---|---|---|---|
| 436,858 | 9/1890 | Kimball | 137—495 XR |
| 762,767 | 6/1904 | Scott | 137—495 |
| 862,614 | 8/1907 | Davey | 251—82 |
| 2,005,445 | 6/1935 | Wiedhofft | 137—505.42 XR |
| 2,050,430 | 8/1936 | Erickson | 137—495 XR |
| 2,091,051 | 8/1937 | Mesinger | 137—505.42 XR |
| 2,706,968 | 4/1955 | Smallpiece | 137—495 XR |
| 2,842,146 | 7/1958 | Schuster | 137—495 XR |
| 3,120,377 | 2/1964 | Lipschultz et al. | 137—495 XR |
| 3,189,041 | 6/1965 | Hansen | 137—495 XR |

FOREIGN PATENTS

| | | |
|---|---|---|
| 76,230 | 2/1950 | Norway. |
| 631,174 | 11/1961 | Canada. |

HENRY T. KLINKSIEK, *Primary Examiner.*

M. CARY NELSON, *Examiner.*

R. J. MILLER, *Assistant Examiner.*

UNITED STATES PATENT OFFICE
CERTIFICATE OF CORRECTION

Patent No. 3,387,622                      June 11, 1968

Richard Weinstein

Figure 3:
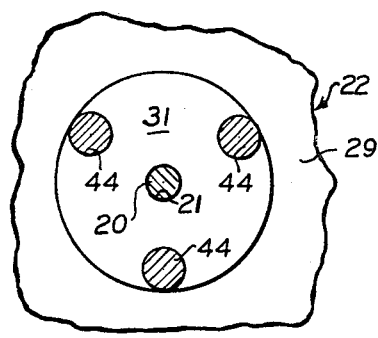
FIG. 3 is a detail view, partly in section, of FIG. 3, taken along line 3—3 therein.

It is certified that error appears in the above identified patent and that said Letters Patent are hereby corrected as shown below:

Column 3, line 16, "Fig. 3", second occurrence, should read -- Fig. 2 --. Column 4, line 4, "37 is" should read -- 37 in --. Column 5, line 37, after "thereby" insert -- closing --. Column 6, line 63, "excess" should read -- exceeds --.

Signed and sealed this 21st day of October 1969.

(SEAL)
Attest:

Edward M. Fletcher, Jr.                 WILLIAM E. SCHUYLER, JR.
Attesting Officer                         Commissioner of Patents